United States Patent
Haag

[19]

[11] Patent Number: 6,093,908
[45] Date of Patent: Jul. 25, 2000

[54] HEATED STEERING WHEEL

[75] Inventor: Ronald Helmut Haag, Clarkston, Mich.

[73] Assignee: Delphi Technologies Inc., Troy, Mich.

[21] Appl. No.: 09/302,721

[22] Filed: Apr. 30, 1999

[51] Int. Cl.$^7$ ...................................................... B60L 1/02
[52] U.S. Cl. .............................................................. 219/204
[58] Field of Search ................................... 219/200, 201, 219/202, 204, 535, 528, 553; 74/552, 557

[56] References Cited

U.S. PATENT DOCUMENTS

| | | | |
|---|---|---|---|
| 2,392,539 | 1/1946 | Leible | 219/204 |
| 4,549,069 | 10/1985 | Oge | 219/204 |
| 4,631,976 | 12/1986 | Noda et al. | 219/204 |

FOREIGN PATENT DOCUMENTS 2285729  10/1997  United Kingdom.

*Primary Examiner*—Tu Ba Hoang
*Attorney, Agent, or Firm*—Kathryn A. Marra

[57] ABSTRACT

A heated steering wheel includes a padding member covering a frame of the heated steering wheel. The heated steering wheel also includes a heating element positioned on the padding member, having an electrically conductive woven textile member and a conductive bus bar attached to the woven textile member. The heated steering wheel further includes an outer wrap enclosing the frame, heating element and padding member.

25 Claims, 2 Drawing Sheets

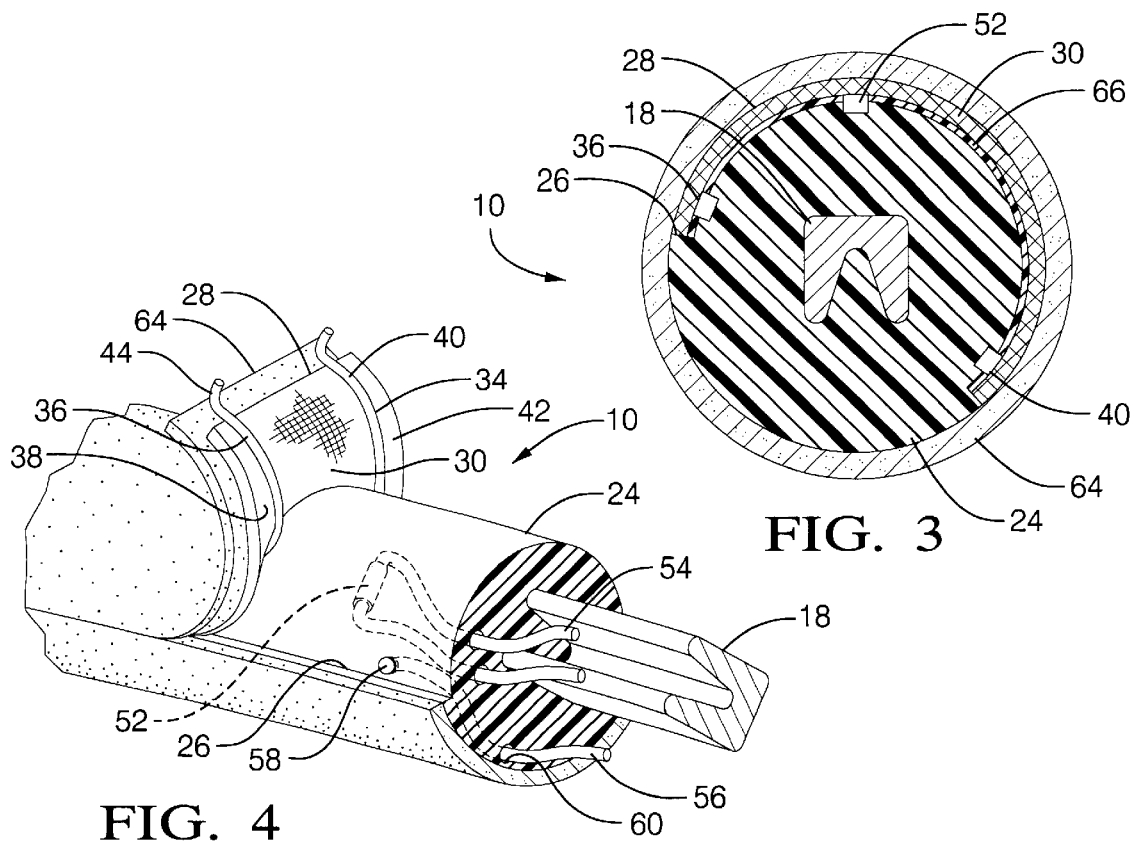
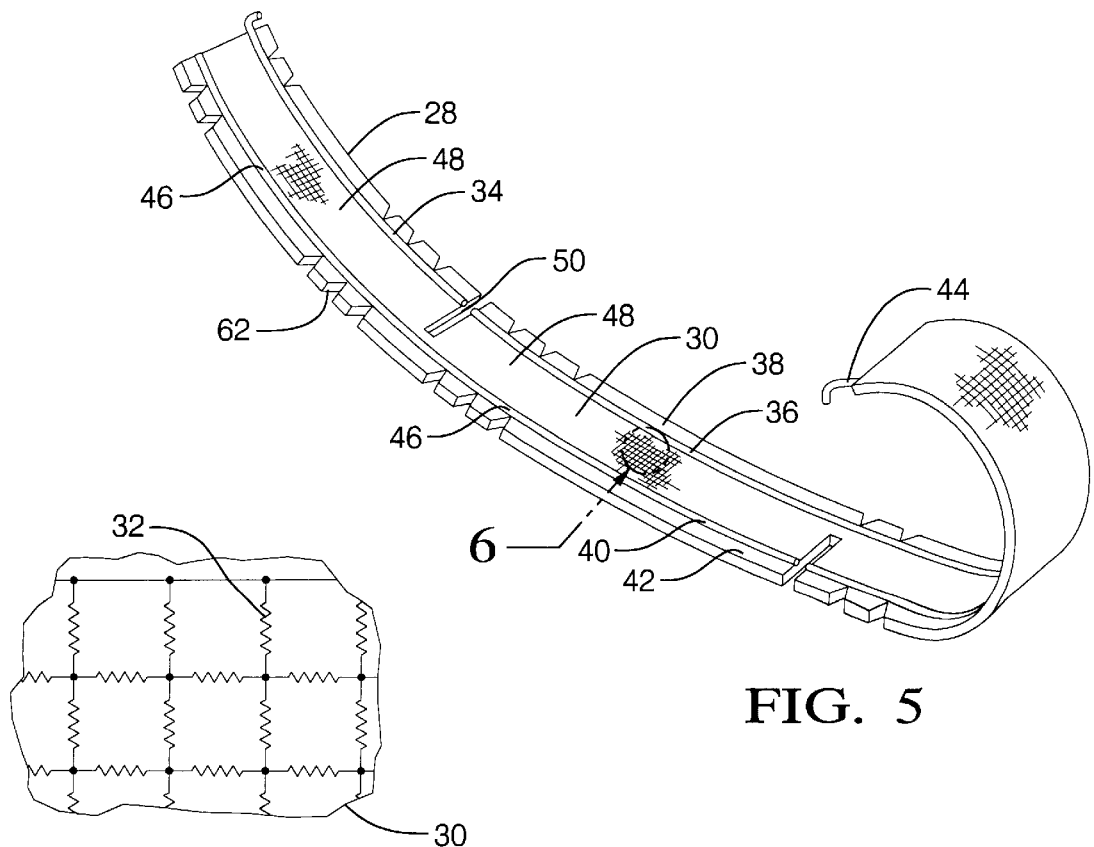

HEATED STEERING WHEEL

TECHNICAL FIELD

The present invention relates generally to steering wheels for vehicles and, more particularly, to a heated steering wheel for an automotive vehicle.

BACKGROUND OF THE INVENTION

Vehicles, and in particular an automotive vehicle, frequently include features that enhance the comfort of an occupant of the vehicle. One example of such a feature is a heated seat for warming the seated occupant, especially in cold weather. Another example is a heated steering wheel, to warm a vehicle driver's hands.

It is known in the art to provide a heated steering wheel that includes a heating element disposed between a frame portion of the steering wheel and an outer wrap portion of the steering wheel. One type of heating element is a conductive wire mesh made of a copper or beryllium material. A characteristic of the wire mesh is that it has a positive temperature coefficient. Thus, as a current is distributed through the wire mesh heating element, the temperature of the heating element increases, which increases its resistance slightly. The current draw eventually decreases and levels off as the desired temperature is reached.

Although the above heated steering wheel has worked well, a characteristic is the length of time it takes to reach the desired temperature. Therefore, there is a need in the art to provide an improved heated steering wheel with a quicker warm-up period.

SUMMARY OF THE INVENTION

It is, therefore, one object of the present invention to provide a heated steering wheel for an automotive vehicle.

It is another object of the present invention to provide a heated steering wheel having a heating element made from an electrically conductive carbon fiber woven textile.

To achieve the foregoing objects, the present invention is a heated steering wheel. The heated steering wheel includes a frame and padding member covering the frame of the heated steering wheel. The heated steering wheel also includes a heating element positioned on the padding member, having an electrically conductive woven textile member and a conductive bus bar attached to the woven textile member. The heated steering wheel further includes an outer wrap enclosing the frame, heating element and padding member.

One advantage of the present invention is that an improved heated steering wheel is provided. Another advantage of the present invention is that the heated steering wheel is easier to manufacture and has an improved appearance. Still another advantage of the present invention is that the heated steering wheel provides a more uniform heat distribution across the surface area of the steering wheel. Yet another advantage of the present invention is that the heated steering wheel has a heating element made of an electrically conductive carbon fiber woven textile with a negative temperature coefficient, to decrease the length of time it takes to reach the desired temperature. A further advantage of the present invention is that the heated steering wheel has a heating element which can be divided into multiple heating zones.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 3 is a fragmentary view of the heated steering wheel of FIG. 1.

FIG. 4 is a perspective view of the heated steering wheel of FIG. 1.

FIG. 5 is a perspective view of a heating element for the heated steering wheel of FIG. 1.

FIG. 6 is an enlarged view of an electrically conductive carbon file woven textile for the heating element of FIG. 5.

DESCRIPTION OF THE PREFERRED EMBODIMENT

Figure 1:
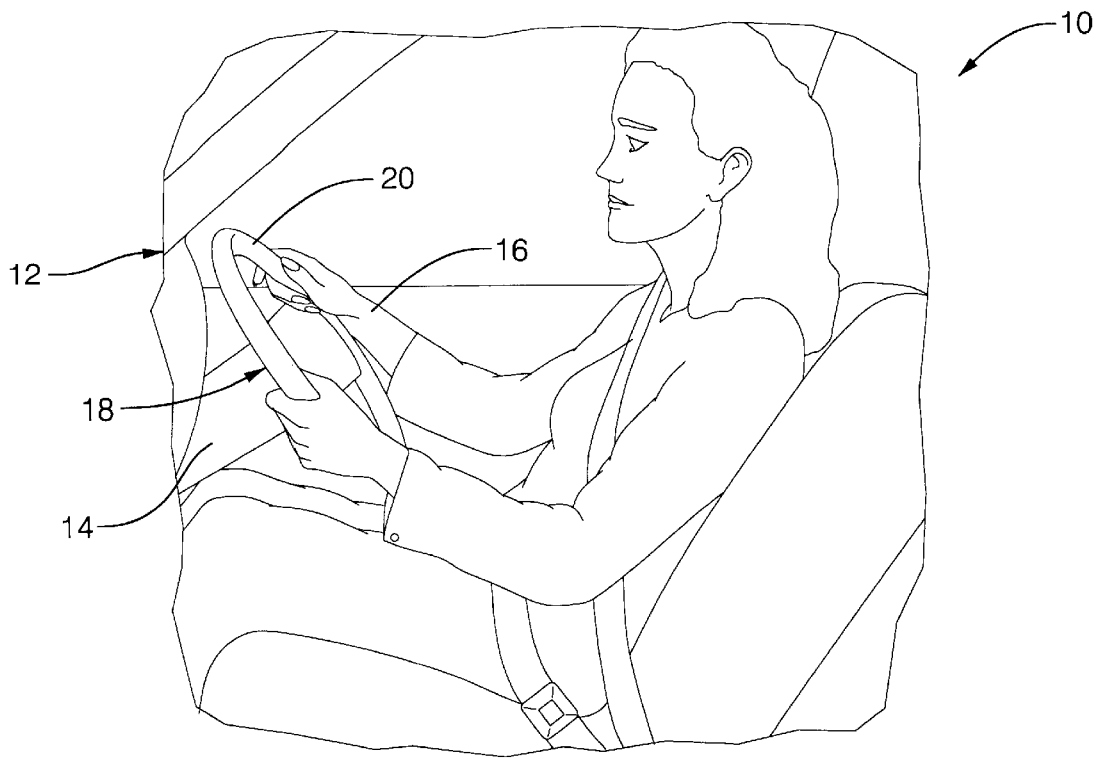
FIG. 1 is a perspective view of a heated steering wheel, according to the present invention, illustrated in operational relationship with a vehicle.
Figure 2:
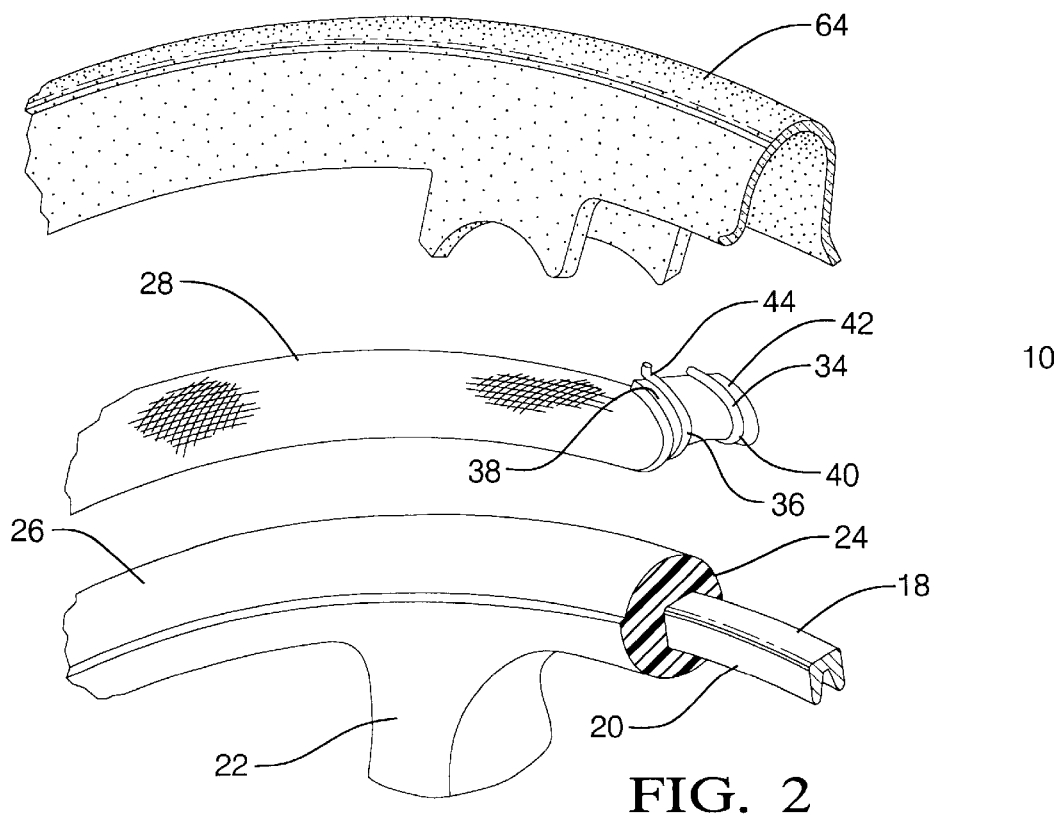
FIG. 2 is an exploded view of the heated steering wheel of FIG. 1.

Referring to the drawings and in particular FIG. 1, one embodiment of a heated steering wheel 10, according to the present invention, is shown for a vehicle (partially shown) such as an automotive vehicle, generally indicated at 12. The heated steering wheel 10 is operably connected to a steering mechanism 14, as is known in the art. An operator's hands 16 typically grip the heated steering wheel 10 to guide the vehicle 12 in the desired direction. Advantageously, the heated steering wheel 10 warms the operator's hands 16 when the ambient temperature is cool.

As shown in FIGS. 2 through 6, the heated steering wheel 10 includes a frame 18 that defines the shape of the heated steering wheel 10. Preferably, the frame 18 is made from a metal material such as magnesium. The frame 18 includes an inner rim (not shown), an outer rim 20 circumscribing the inner rim and at least one spoke 22 interconnecting the inner rim with the outer rim 20. The inner rim, outer rim 20 and spoke 22 form an integral and one-piece frame 18 for the heated steering wheel 10.

The heated steering wheel 10 also includes a padding member 24 that encloses the frame 18. The padding member 24 cushions the frame 18 to enhance the comfort of the heated steering wheel 10 for the operator's hands 16. In this example, the padding member 24 is a cushioning material such as urethane. Advantageously, the padding member 24 may be molded. The padding member 24 may include a groove 26 extending longitudinally and transversely a suitable distance along its outer surface, for a purpose to be described.

The heated steering wheel 10 also includes a heating element 28 positioned on the padding member 24. The heating element 28 is a generally planar member that extends longitudinally and transversely a suitable amount to provide heat to the desired surface area of the heated steering wheel 10. In this example, the heating element 28 provides the heat to warm up the outer rim 20 portion of the heated steering wheel 10.

The heating element 28 includes an electrically conductive woven textile member 30, such as an all carbon fiber woven textile. An example of a carbon fiber woven textile member 30 is disclosed in UK Patent Number GB2285729B to Gorix, LTD., which is hereby incorporated by reference. A characteristic of the woven textile member 30 is its tight weave. The woven textile member 30 contains a plurality of woven fibers 32. Each fiber 32 is a small resistor, with a plurality of fiber resistors 32 arranged in parallel, as shown in FIG. 6. For example, a one (1) mm square contains many parallel fiber resistors 32. The total combination of parallel fiber resistors 32 adds up to a total resistance value. The many parallel fiber resistors 32 provides for a more even heat distribution. Advantageously, if one fiber resistor 32 breaks, there is a minimal effect on the overall resistance of the woven textile member 30. In comparison, a similar one (1) mm square of mesh material (not shown) forms fewer parallel resistors. Therefore, if a wire in a wire mesh breaks, the break in the resistive path would result in uneven heating or hot spots in the heating element 28.

Advantageously, the carbon fiber woven textile member 30 has the unique property of a negative temperature coefficient. Accordingly, as power is applied to the heating element 28, the resistance of the woven textile member 30 decreases, the temperature increases and the current increases. As a result, the carbon fiber woven textile member 30 reaches the desired temperature at a faster rate than another material, such as a mesh, having a positive temperature coefficient.

The heating element 28 also includes a bus bar 34 extending longitudinally along an outer edge of the textile member 30. Preferably, the bus bar 34 is a flat braided wire, to maintain a smooth outside appearance of the heated steering wheel 10. The bus bar 34 is attached to the textile member 30 using a conventional technique such as gluing, sewing or weaving. It should be appreciated that, in this example, there is a first bus bar 36, positioned along a first outer edge 38 of the woven textile member 30 and a second bus bar 40 positioned along a second outer edge 42. One end of the bus bar 34 may include a terminal 44 for connecting the bus bar 34 to a power source (not shown) in a manner to be described.

The bus bar 34 conducts a current through the textile member 30 from the power source. Since the heating element 28 is composed of a plurality of fiber resistors 32 arranged in parallel, the shape and size of the heating element 28 affects the current draw. For example, a predetermined current draw of seven (7) amps implies that the heating element 28 has a resistance value of approximately 1.8 ohms. If the shape and size of the heating element 28 is configured to fit around a conventionally sized outer rim 20, the resistance value may be too low, implying a high current draw.

Therefore, the heating element 28 may be configured into a plurality of heating zones 46, with each heating zone having a resistive element 48. The resistive elements 48 are separated by a slit 50 extending through the textile member 30 and one of the bus bars 34, as illustrated in FIG. 5. In this example, one slit 50 extends transversely through the textile member 30 and the first bus bar 36, while another slit 50 begins on an opposite side from the first slit 50 and extends transversely through the textile member 30 and the second bus bar 40. Advantageously, the slits 50 are arranged in an opposed manner, to create a plurality of resistive elements 48 in series. It should be appreciated that if the slits 50 were all on the same side, the plurality of resistive elements 50 would not be in series.

The number and location of the heating zones 46 will affect the heat distribution around the perimeter of the heated steering wheel 10. Therefore, if uniform resistive heating zones 46 are desired throughout the entire heated steering wheel 10, then each series resistive element 48 requires a common dimension. If multiple resistive heating zones 46 are preferred, such that different heating zones 46 of the heated steering wheel 10 have different predetermined temperatures, than the heating element 28 requires a series network of resistive elements 48 having various resistances due to the length of each resistance element 48. For example, a resistive element 48 with a higher resistance heats up quicker than another resistive element 48 in series having a smaller resistance. It may be desirable to have a resistive element 48 with a higher resistance, in series with other resistance elements 48, covering that portion of the heated steering wheel 10 that is most frequently in contact with the operator's hands 16, so that it is warmer than the other areas.

The heated steering wheel 10 may also include a temperature sensor 52 for maintaining the temperature of the heating element 38 at a predetermined temperature, such as 107° F. An example of a temperature sensor 52 is a thermistor. The thermistor measures a resistance, which can be correlated with a temperature. The temperature sensor 52 is disposed between the heating element 28 and the padding member 24, so that the temperature sensor 52 is in contact with the heating element 28. Advantageously, the temperature sensor 52 may be embedded in the padding member 24 to maintain the smooth outside appearance of the heated steering wheel 10. The temperature sensor 52 is electrically connected by a wire 54 to a controller (not shown) The controller, as is known in the art, controls the temperature of the heating element 28 based on the sensed temperature from the temperature sensor 52.

The heating element 28 is electrically connected to a power source, such as the controller, having a power wire 56 and a ground wire (not shown). The power wire 56 and ground wire each have a terminal end connector 58, as is conventional in the art, that interconnects with a corresponding terminal end fitting 44 on the bus bar 34. In this example, the power wire 56 from the power source is connected to the first bus bar 36, and the ground wire from the power source is connected to the second bus bar 40. The terminal end connectors 44, 58 may be located within the padding member 24 using a conventional method, such as insert molding the wire leads 56 and connectors to the bus bar 34, or by molding a duct 60 in the padding member 24 to lay the wire 56 into. It should be appreciated that these methods allow for a smooth outer appearance of the heated steering wheel 10.

The heating element 28 may be placed on the padding member 24 using a suitable method. In this example, the heating element 28 is placed in the groove 26 in the padding member 24. The heating element 28 may include an adhesive backing for securely positioning the heating element 28 on the padding member 24. The heating element 28 may also be preformed, to maintain the desired shape around the padding member 24. Alternatively, the heating element may include a plurality of notches 62 along an outer edge of the textile member 30 to assist in positioning the heating element 28 around the frame 18.

The heated steering wheel 10 also includes an outer wrap 64 that covers the frame 18 to provide a decorative appearance to the heated steering wheel 10. It should be appreciated that the outer wrap 64 may be made from a combination of materials to achieve the desired decorative appearance. For example, a portion of the outer wrap 64 covering the outer rim 20 and spoke 22 may be a material such as leather, while a portion of the outer wrap 64 covering the inner rim may be a material such as plastic.

The heated steering wheel 10 may include an insulating sheet 66 disposed between the heating element 28 and the padding member 24, to direct the flow of heat in an outwardly direction. The heated steering wheel 10 may also include a cushioning layer (not shown) disposed between the heating element 28 and outer wrap 64, to enhance the appearance or feel of the steering wheel. An example of a cushioning layer is a breathable foam.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A heated steering wheel for a vehicle comprising:
   a frame;
   a padding member covering said frame;
   a heating element positioned on said padding member, wherein said heating element includes an electrically conductive woven textile member having a negative temperature coefficient and a conductive bus bar attached to said woven textile member; and
   an outer wrap enclosing said frame, said heating element and said padding member.

2. A heated steering wheel as set forth in claim 1 wherein said padding member includes a groove extending longitudinally and transversely to receive said heating element.

3. A heated steering wheel for a vehicle comprising:
   a frame;
   a padding member covering said frame;
   a heating element positioned on said padding member, wherein said heating element includes an electrically conductive woven textile member and a conductive bus bar attached to said woven textile member;
   an outer wrap enclosing said frame, said heating element and said padding member; and
   wherein said heating element is a carbon fiber woven textile having a negative temperature coefficient.

4. A heating steering wheel as set forth in claim 1 including a first bus bar positioned along a first outer edge of said textile member and a second bus bar positioned along a second outer edge of said textile member.

5. A heated steering wheel as set forth in claim 1 wherein said bus bar is a flat, braided wire.

6. A heated steering wheel as set forth in claim 1 wherein said heating element is configured into a plurality of heating zones, wherein each of said heating zones includes a resistive element.

7. A heated steering wheel as set forth in claim 6 including a plurality of slits extending transversely through said heating element to separate said heating element into said heating zones arranged in series.

8. A heated steering wheel as set forth in claim 7 wherein a plurality of slits are alternately arranged.

9. A heating steering wheel as set forth in claim 1 including a temperature sensor for maintaining a predetermined temperature of said heating element.

10. A heated steering wheel for a vehicle comprising:
    a frame;
    a padding member covering said frame;
    a heating element positioned on said padding member, wherein said heating element includes an electrically conductive woven textile member and a conductive bus bar attached to said woven textile member;
    an outer wrap enclosing said frame, said heating element and said padding member; and
    wherein said textile member contains a plurality of notches between an outer edge and said bus bar to position said heating element around said padding member.

11. A heated steering wheel for a vehicle comprising:
    a frame;
    a padding member covering said frame;
    a heating element positioned on said padding member, wherein said heating element includes a electrically conductive carbon fiber woven textile member having a negative temperature coefficient and a conductive bus bar attached to said woven textile member;
    a temperature sensor disposed between said heating element and said padding member for maintaining a predetermined temperature of said heating element; and
    an outer wrap enclosing said frame, said heating element and said padding member.

12. A heated steering wheel as set forth in claim 11 wherein said padding member includes a groove extending longitudinally and transversely to receive said heating element.

13. A heated steering wheel as set forth in claim 11 including a first bus bar positioned along a first outer edge of said textile member and a second bus bar positioned along a second outer edge of said textile member.

14. A heated steering wheel as set forth in claim 11 wherein said bus bar is a flat, braided wire.

15. A heated steering wheel as set forth in claim 11 wherein said heating element is configured into a plurality of heating zones, and each of said heating zones includes a resistive element.

16. A heated steering wheel as set forth in claim 15 including a slit extending transversely through said heating element to separate said heating element into a plurality of heating zones arranged in series.

17. A heated steering wheel as set forth in claim 16 wherein said slits are alternately arranged.

18. A heated steering wheel as set forth in claim 11 wherein said textile member contains a plurality of notches between an outer edge and said bus bar to position said heating element around said padding member.

19. A heated steering wheel for a vehicle comprising:
    a frame;
    a padding member covering said frame, wherein said padding member includes a groove extending longitudinally and transversely;
    a heating element positioned on said padding member, wherein said heating element includes an electrically conductive carbon fiber woven textile member having a negative temperature coefficient and a first conductive bus bar attached along a first outer edge of said textile member and a second conductive bus bar attached along a second outer edge of said textile member;
    a temperature sensor disposed between said heating element and said padding member for maintaining a predetermined temperature of said heating element; and
    an outer wrap enclosing said frame, said heating element and said padding member.

20. A heated steering wheel as set forth in claim 19 wherein each of said bus bars is a flat, braided wire.

21. A heated steering wheel as set forth in claim 19 wherein said heating element is configured into a plurality of heating zones, and each of said heating zones includes a resistive element.

22. A heated steering wheel as set forth in claim 21 including a plurality of slits extending transversely through said heating element to separate said heating element into said heating zones arranged in parallel.

23. A heated steering wheel as set forth in claim 22 wherein said slits alternately arranged.

24. A heated steering wheel as set forth in claim 21 wherein said resistive elements each have the same resistance.

25. A heated steering wheel as set forth in claim 21 wherein said resistive elements each have different resistances.

* * * * *